United States Patent
Green

(10) Patent No.: US 11,148,668 B2
(45) Date of Patent: Oct. 19, 2021

(54) AUTONOMOUS VEHICLE CONTROL FOR REVERSE MOTION

(71) Applicant: UATC, LLC, San Francisco, CA (US)

(72) Inventor: Colin Jeffrey Green, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 16/717,058

(22) Filed: Dec. 17, 2019

(65) Prior Publication Data

US 2021/0107484 A1    Apr. 15, 2021

Related U.S. Application Data

(60) Provisional application No. 62/915,302, filed on Oct. 15, 2019.

(51) Int. Cl.
*B60W 30/18* (2012.01)
*B60W 50/00* (2006.01)

(52) U.S. Cl.
CPC .. *B60W 30/18036* (2013.01); *B60W 50/0097* (2013.01); *B60W 2050/0028* (2013.01)

(58) Field of Classification Search
CPC ....... B60W 30/18036; B60W 50/0097; B60W 2050/0028
See application file for complete search history.

(56) References Cited

U.S. PATENT DOCUMENTS

| | | | | |
|---|---|---|---|---|
| 9,346,467 B2* | 5/2016 | Hahne | ...................... | G05D 1/00 |
| 10,710,633 B2* | 7/2020 | Carlson | ................ | G05D 1/0274 |
| 2015/0203156 A1* | 7/2015 | Hafner | ................. | B62D 15/027 |
| | | | | 701/36 |
| 2016/0155331 A1* | 6/2016 | Mielenz | .................... | G08G 1/14 |
| | | | | 340/932.2 |
| 2018/0326982 A1* | 11/2018 | Paris | ..................... | G05D 1/0088 |
| 2019/0016312 A1* | 1/2019 | Carlson | ................... | B60L 53/66 |
| 2019/0161086 A1* | 5/2019 | Bettger | ................. | B60W 50/14 |
| 2019/0286162 A1* | 9/2019 | Fischer | .................... | G08G 1/22 |
| 2020/0174482 A1* | 6/2020 | Cheon | ................. | G05D 1/0214 |
| 2020/0180691 A1* | 6/2020 | Sandblom | ....... | B60W 30/18036 |
| 2020/0346637 A1* | 11/2020 | Zhou | .................. | G06K 9/00805 |

OTHER PUBLICATIONS

US 11,022,970 B2, 06/2021, Levinson (withdrawn)*

* cited by examiner

*Primary Examiner* — Yazan A Soofi
*Assistant Examiner* — Naeem Taslim Alam
(74) *Attorney, Agent, or Firm* — Dority & Manning, P.A.

(57) ABSTRACT

The present disclosure is directed to a system for autonomous vehicle control for reverse motion. The system accesses a route with one or more route sections, the one or more route sections including a reverse driving section through an environment. The system accesses physical model data representing a position and actual orientation of the autonomous vehicle in the environment. The system modifies the physical model data to generate a simulated orientation for the autonomous vehicle based on a direction associated with the reverse driving section. The system transmits data associated with the reverse driving section of the accessed route and the modified physical model data to a motion planner. The system receives from the motion planner, one or more control signals for the autonomous vehicle. The system transmits the one or more control signals to a vehicle control system of the autonomous vehicle.

20 Claims, 11 Drawing Sheets

PLANNED MOVEMENT

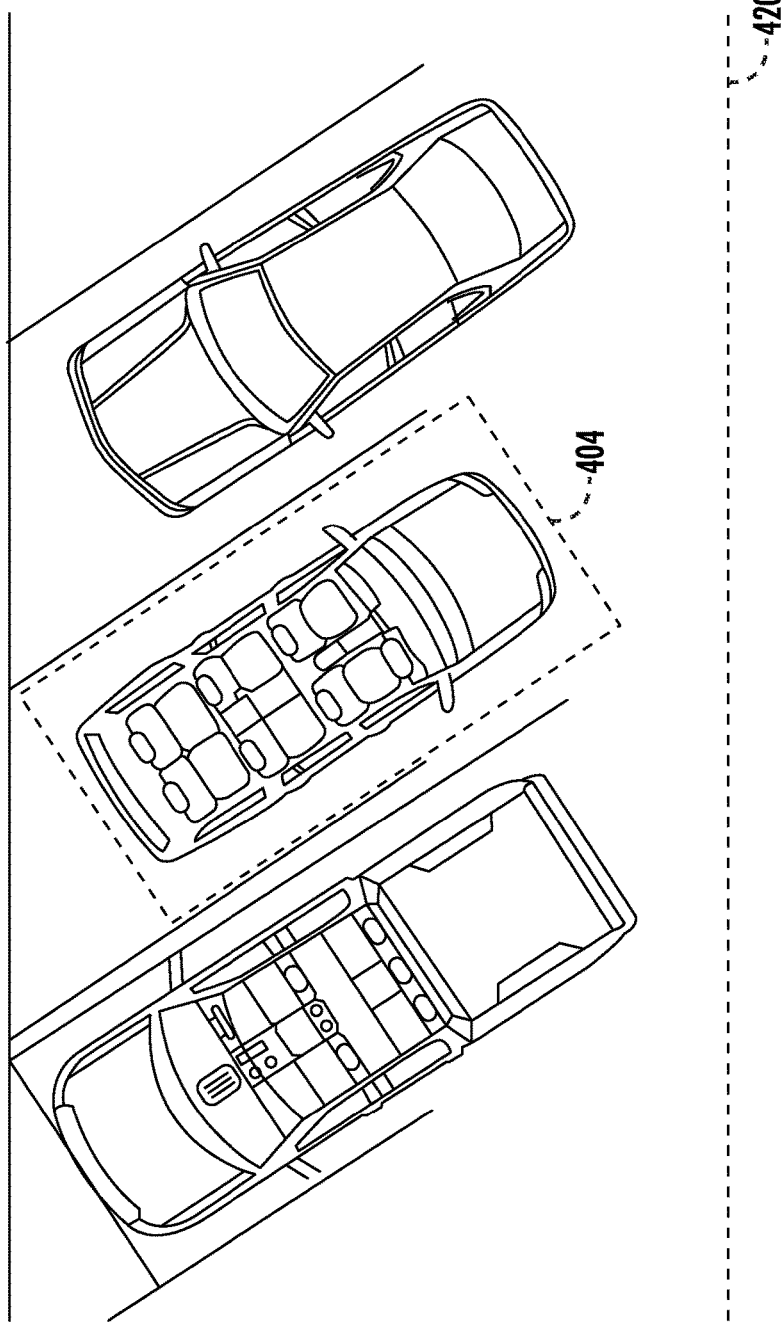

AUTONOMOUS VEHICLE CONTROL FOR REVERSE MOTION

RELATED APPLICATION

The present application is based on and claims benefit of U.S. Provisional Patent Application No. 62/915,302 having a filing date of Oct. 15, 2019, which is incorporated by reference herein.

FIELD

The present disclosure relates generally to autonomous vehicles. More particularly, the present disclosure relates to motion control for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include accessing, by a computing system comprising one or more computing devices, a route with one or more route sections, the one or more route sections including a reverse driving section through an environment. The method can include accessing, by the computer system, physical model data representing a position and actual orientation of the autonomous vehicle in the environment. The method can include modifying, by the computer system, the physical model data to generate a simulated orientation for the autonomous vehicle based on a direction associated with the reverse driving section. The method can include transmitting, by the computer system, data associated with the reverse driving section of the accessed route and the modified physical model data to a motion planner. The method can include receiving, by the computer system, from the motion planner, one or more control signals for the autonomous vehicle. The method can further include transmitting, by the computer system, the one or more control signals to a vehicle control system of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which:

FIGS. 4A-4D depict an example situation in which an autonomous vehicle can drive in reverse according to example embodiments of the present disclosure;

DETAILED DESCRIPTION

Figure 1:
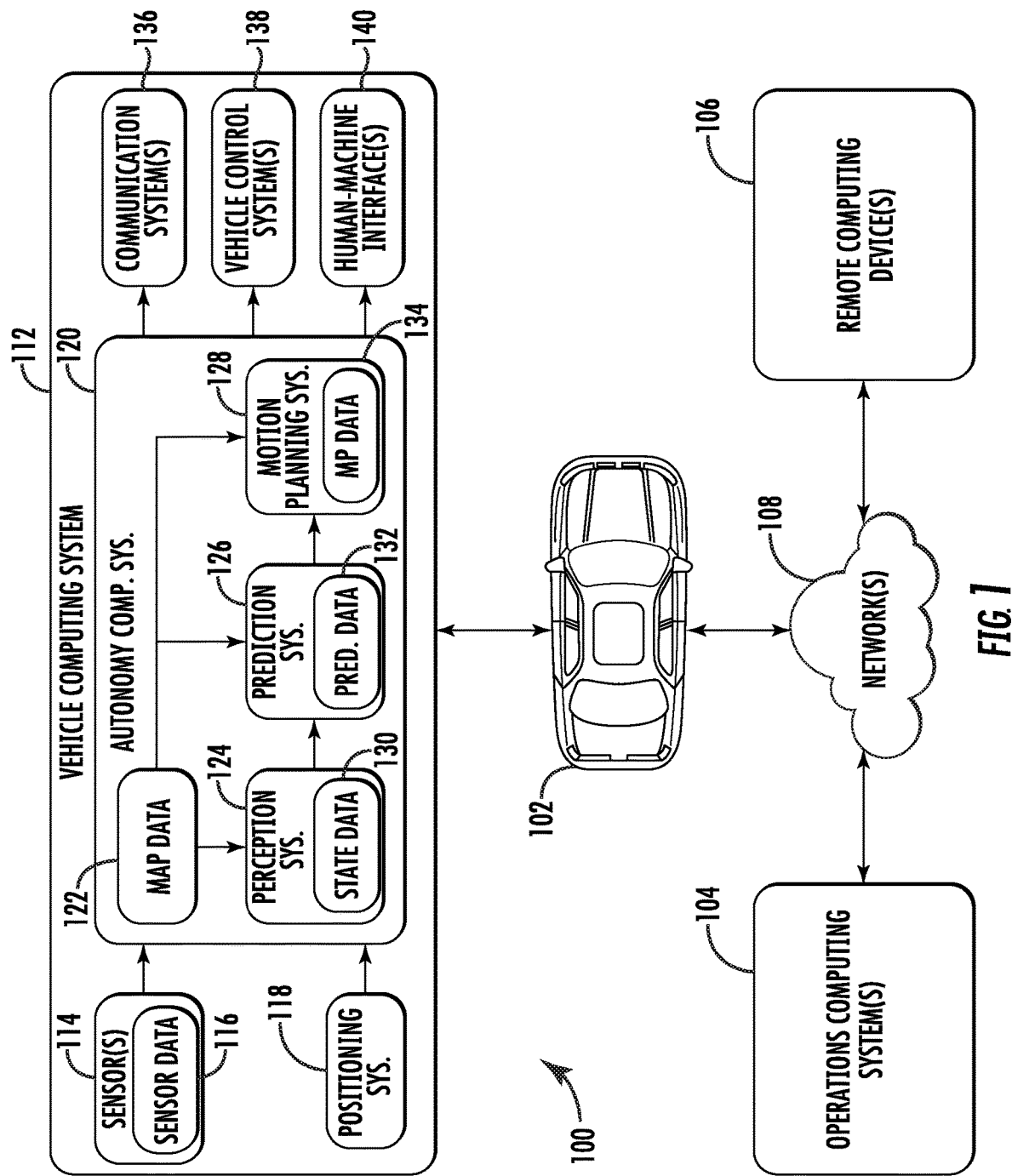
FIG. 1 depicts an example autonomous vehicle computing system according to example aspects of the present disclosure.

Generally, the present disclosure is directed to computing systems and methods for enabling an autonomous vehicle to drive in reverse by leveraging the existing motion planner that the autonomous vehicle uses to plan forward motion for the autonomous vehicle. A self-driving system, in accordance with some examples, can include a route planning engine that generates a route for an autonomous vehicle. If the route-planning engine generates a route that includes a reverse driving section, the self-driving system can modify stored model data for the autonomous vehicle and allow a motion planner to create one or more motion signals for the autonomous vehicle as though the autonomous vehicle is moving forward. The one or more motion signals can be used to enable the autonomous vehicle to move in reverse. For example, the autonomous vehicle can be parked in a parking space orthogonally to a sidewalk. A route planning engine can determine that a route for the autonomous vehicle includes a section with backwards driving (to reverse out of the parking spot). With no specific reverse driving model implemented, the autonomous vehicle can be configured to employ existing self-driving resources to enable reverse driving. In response to determining the upcoming section of the route includes reverse driving, the self-driving system can access a stored physical model data that represents the current position, heading, and environment of the autonomous vehicle. A model modifier can modify the stored heading in the physical model data such that the physical vehicle model data indicates that the autonomous vehicle is facing outwards from the parking spot rather than facing into the parking spot. The model modifier can also alter stored data about the environment, including reversing, in a stored model of the environment, the driving direction of one or more lanes of traffic and switching the lane lines from right to left. In addition, the physical model data describing the shape, size, and driving dynamics of the autonomous vehicle can be modified such that the stored physical model data of the autonomous vehicle can be completely reversed, so that the internal model data of the autonomous vehicle represents an autonomous vehicle with the traditional back end of the autonomous vehicle being designated as a front end and the traditional front end of the autonomous vehicle being designated as the back end of the autonomous vehicle.

The self-driving system can send data for the reverse driving section of the route to a motion planner. The motion planner can use the specified section of the route and the modified physical model data to generate specific driving control signals to move the autonomous vehicle along the section of the route to the specified target position or destination (which may also be referred to as a target pose for the autonomous vehicle). The motion planner, using the data stored in the physical model data, can generate a motion plan in which the autonomous vehicle is modeled as driving forward (because the stored vehicle model has been modified such that the motion planner sees the autonomous vehicle oriented towards the desired direction.) Thus, the motion planner can generate the motion plan using its existing tools for driving forward.

It should be noted that the words "travelling" and "driving" are both used herein to describe the motion of an autonomous vehicle in a particular direction and are intended to be broadly synonymous. Although driving may typically be used when referencing an autonomous vehicle that is an automobile (e.g., any vehicle that is driven) and travelling is used to represent moving vehicles more broadly (e.g., an autonomous plane or train may be described as travelling rather than driving), the use of the word drive or driving in a given example does not imply or suggest that only autonomous vehicles that can be driven are contemplated for that particular example. Instead, all types of autonomous vehicles are contemplated in each example unless specifically excluded by the description of that example.

As long as the model is updated with the correct dimensions (e.g., how far the bumpers of the autonomous vehicle extend in each direction) and the correct driving dynamics (e.g., a vehicle with front wheel drive may be represented as having rear-wheel drive for the purposes of the motion planner), the forward driving motion plan can be used to drive in reverse.

In addition, the self-driving system can alter the velocity of the motion plan from a positive value to a negative value with the same absolute value. This motion plan can be sent to the vehicle control system of the autonomous vehicle. The vehicle control system can implement the motion plan (with the reverse velocity) to drive in reverse along the correct path to the target destination for this section of the route.

More particularly, an autonomous vehicle can include a vehicle computing system. The vehicle computing system can be responsible for creating the control signals needed to effectively control an autonomous vehicle. To do so, the vehicle computing system can include an autonomy computing system. The autonomy computing system can include one or more systems that enable the autonomous vehicle to plan a route, receive sensor data about the environment, predict the motion of other vehicles, generate a motion plan based on the sensor data and predicted motion of other vehicles, and, based on the motion plan, transmit control signals to a vehicle control system and thereby enable the autonomous vehicle to move to its target destination.

For example, an autonomy computing system can access sensor data from one or more sensors to identify objects in the autonomous vehicle's environment. Similarly, the autonomous vehicle can use a positioning system or a communication system to determine its current location. Based on this location information, the autonomy computing system can use map data to determine the autonomous vehicle's current position relative to other objects in the world, such as streets, buildings, and so on.

In some example embodiments, a perception system can access one or more sensors to identify one or more objects in the local environment of the autonomous vehicle. The sensors can include, but are not limited to: camera sensors, LIDAR sensors, and RADAR sensors. Using this sensor data, the perception system can generate perception data which describes one or more objects in the vicinity of the autonomous vehicle. The generated perception data can be sent to a prediction system. The prediction system can use the perception data to generate predictions for the movement of one or more objects. This prediction data can be sent to a motion planning system. The motion planning system can use received prediction data and map data to generate a motion plan.

In some examples, a motion plan can describe a specific route for the autonomous vehicle to take from a current location to destination location. In some examples, the motion plan can include one or more route sections. Each route section can describe a section of a planned path for the autonomous vehicle. In some examples, the motion planning system can send one or more motion plans to the vehicle control system. The vehicle control system can use the received motion plans to generate specific control signals for the autonomous vehicle. The specific control signals can cause the autonomous vehicle to move in accordance with the motion plan.

In some example embodiments, the autonomous vehicle can be assigned to operate as part of a service entity. A service entity (e.g., service provider, owner, manager, platform) can use one or more vehicles (e.g., ground-based vehicles) to provide one or more vehicle services such as a transportation service (e.g., rideshare service), a courier service, a delivery service, etc. For example, the service entity (e.g., its operations computing system) can receive requests for vehicle services (e.g., from a user) and generate service assignments (e.g., indicative of the vehicle service type, origin location, destination location, and/or other parameters) for the autonomous vehicle(s) to perform. The vehicle(s) can be autonomous vehicles that include various systems and devices configured to control the operation of the autonomous vehicle. For example, an autonomous vehicle can include an onboard vehicle computing system for operating the autonomous vehicle (e.g., located on or within the autonomous vehicle).

The vehicle computing system can obtain sensor data from one or more sensor(s) onboard the autonomous vehicle (e.g., cameras, LIDAR, RADAR, etc.), attempt to comprehend the autonomous vehicle's surrounding environment by performing various processing techniques on the sensor data, and generate an appropriate motion plan through the autonomous vehicle's surrounding environment. Moreover, an autonomous vehicle can be configured to communicate with one or more computing devices that are remote from the autonomous vehicle. For example, the autonomous vehicle can communicate with a remote computing system that can be associated with the service entity, such as the service entity's operations computing system, and/or a remote computing system associated with a third-party entity, such as a third-party entity's computing system. The service entity's operations computing system can include a plurality of system clients that can help the service entity monitor, communicate with, manage, etc. autonomous vehicles. In this way, the service entity can manage the autonomous vehicles to provide the vehicle services of the entity.

A user can provide (e.g., via a user computing device) a request for a vehicle service to an operations computing system associated with the service entity. The request can indicate the type of vehicle service that the user desires (e.g., a user transportation service, a delivery service, a courier service, etc.), one or more locations (e.g., an origin, destination, etc.), timing constraints (e.g., pick-up time, drop-off time, deadlines, etc.), a number of user(s) and/or items to be transported in the autonomous vehicle, other service parameters (e.g., a need for handicap access, handle with care instructions, etc.), and/or other information.

The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system so that the autonomous vehicle computing system can communicate with the operations computing system via a network of the service entity. Once online, the operations computing system can communicate a vehicle service assignment indicative of the requested vehicle services and/or other data to the autonomous vehicle.

In some example embodiments, a self-driving system uses one or more existing components to facilitate reverse travelling (e.g., driving, etc.) without the need to train the system with instructions dedicated to implementing the reverse travelling capability. Such a self-driving system can include a route generator, a model modifier, a motion planner, a control signal modifier, and a vehicle control system. In some example embodiments, the self-driving system can be integrated into the above-discussed vehicle computing system. In this example, a route generator can generate or receive a planned route with one or more sections. In some examples, the planned route can be received from a service system that transmits a planned destination for an autonomous vehicle to the self-driving system of the autonomous vehicle. In some examples, the route generator generates the route itself based on user input or a destination (e.g., the destination received from the self-driving system, a destination received from a third-party, etc.).

In some examples, the route generator can determine, for each section of the generated route, whether the route section includes reverse travelling (e.g., driving). In some examples, the route generator can determine whether a specific route section involves reverse driving by accessing a metadata flag associated with each route section that represents whether the route section involves forward movement or backward movement. In some examples, a given route section for an autonomous vehicle can comprise one of either forward driving or reverse driving. Thus, if the flag for reverse driving is set to indicate reverse driving, that route section will be entirely comprised of reverse driving. Similarly, if the metadata flag is not set to indicate reverse driving, the associated route section will only include forward driving.

In some example embodiments, in accordance with a determination that a particular route section includes reverse movement, the route generator can transmit the route section data to a model modifier. In accordance with the determination that the current route section does not include reverse motion, the route generator can transmit the route section data directly to a motion planner without accessing the model modifier.

In some example embodiments, the model modifier can, in response to receiving route section data from the route generator, access stored physical model data for the current autonomous vehicle. The physical model data for a particular autonomous vehicle can represent one or more physical characteristics of the autonomous vehicle and its current environment. For example, the physical model data can include data fields representing one or more of: a heading of the autonomous vehicle, a shape of the autonomous vehicle, a position of the autonomous vehicle, the location and size of bumpers on the autonomous vehicle, the driving dynamics of the autonomous vehicle (e.g., how the autonomous vehicle's physical form responds to acceleration and/or turning), the location and position of traffic lanes, etc. This physical model data can be used by a motion planner to ensure that the autonomous vehicle can move safely through an environment.

In some example embodiments, the model modifier can modify the stored physical model data including changing stored heading of the autonomous vehicle. For example, the model modifier can reverse (e.g., change by 180 degrees) the heading of the autonomous vehicle such that the stored representation of the autonomous vehicle appears to be facing in the exact opposite direction as the autonomous vehicle is actually facing in the physical world. In addition, the model modifier can change the physical model data representing the size and shape of the autonomous vehicle. The model modifier can modify physical model data representing the driving dynamics of the autonomous vehicle. The result of these changes is to modify the stored physical model data of the autonomous vehicle such that physical model data indicates a forward moving autonomous vehicle, but the stored physical model data is shaped like and moves like an autonomous vehicle moving in reverse. As a result, the motion planner makes a motion plan as though the autonomous vehicle were moving forward, but the motion plan will be appropriate for the autonomous vehicle when moving in reverse. Thus, the motion planner does not need specific software to enable reverse motion (e.g., driving, traveling or any other type of motion). Instead, the self-driving system can use the existing motion planning system to plan reverse motion without at least one component in the self-driving system (e.g., the motion planner) being aware that the autonomous vehicle will be moving in reverse.

In some examples, once the model modifier has finished updating the physical model data, the route section can be transmitted to the motion planner. As noted above, the motion planner can generate a motion plan using the modified physical model data and planning a forward travelling section. In some examples, the motion planner can send a motion plan directly to the vehicle control system. For example, when a route section includes forward travelling the motion planner can transmit the motion plan directly to the vehicle control system without the need for the control signal modifier to correct the velocity of the motion plan. In some examples, the motion planner first transmits the motion plan to a control signal modifier. In some examples, the control signal modifier receives the motion plan from the motion planner.

If the motion plan is associated with a route section that includes reverse motion, the control signal modifier can adjust the motion plan such that it can be implemented by the vehicle control system correctly. For example, because the motion planner based the motion plan on stored physical model data that had been modified such that the stored physical data of the autonomous vehicle does not match the actual physical data for the autonomous vehicle, the generated motion plan can be modified to ensure that the vehicle control system can cause the autonomous vehicle to move in the correct direction.

Specifically, the velocity included of the motion plan as generated by the motion planner can include positive forward motion when in fact the autonomous vehicle needs to move backward. The control signal modifier can reverse the polarity of the planned velocity from positive to negative. Thus, if the planned velocity is three meters per second in a positive direction, the control signal modifier can reverse the velocity to a negative value of three meters per second. In addition, the control signal modifier may also reset the stored physical model data to their original and correct values.

Once the control signal modifier has modified the motion plan, the motion plan can be sent to the vehicle control system. In some example embodiments, the vehicle control system can generate one or more control signals that can cause the execution of the motion plan to move the autonomous vehicle from its current position to the target destination. In some examples, the control signals can control the acceleration, braking, and heading of the autonomous vehicle.

As an example of the above methods and systems, an autonomous vehicle can be parked such that forward motion is not possible. For example, the autonomous vehicle can be parked against a sidewalk to pick up a passenger or parked close enough to another vehicle that forward motion is not possible. A service system may have directed the autonomous vehicle to park in a passenger loading zone such that the autonomous vehicle is positioned orthogonally to a sidewalk. In this example, the autonomous vehicle is unable to exit the parking spot by moving forward. Thus, the self-driving system can determine that the autonomous vehicle needs to travel in reverse to exit the parking spot.

In response, the model modifier can update the physical vehicle model data such that stored physical model data represents the autonomous vehicle as facing outwards from the sidewalk. It is important to note that the autonomous vehicle has not changed its actual heading to face outwards. Instead, only the stored physical model data representing the autonomous vehicle's position has changed. A motion planner can access this modified data while generating a motion plan to move the autonomous vehicle from its current position to a destination position.

The model modifier can modify other data fields of the physical model data. As noted above, the model modifier can modify data fields representing the autonomous vehicle's shape, size, and dimensions such that the stored physical model data is shaped as if the autonomous vehicle is facing backward even though the stored physical vehicle model data indicates that the autonomous vehicle is facing forward.

Once the physical model data has been modified, the motion planner can generate a motion plan to move the autonomous vehicle from the parking spot into a travel way (e.g., a road). Because the stored physical model data indicates that the autonomous vehicle is facing out of the parking spot, the motion planner can generate a motion plan for the autonomous vehicle that directs it to move forward out of the parking spot.

In some example embodiments, the autonomous vehicle executes the motion plan. However, because the motion plan is created using a forward-facing vehicle model, the velocity included in the motion plan is initially positive and can be reversed from a positive value to a negative value with the same magnitude. Using this reversed velocity value, the autonomous vehicle can drive out of the parking spot in reverse even though the motion plan is created using a forward-facing vehicle model. In this way, the autonomous vehicle can be enabled to drive in reverse without specific software or model improvements designed to implement that functionality.

In some example embodiments, a self-driving system accesses a route with one or more route sections. For each route section, the self-driving system can determine whether the route section is a reverse travelling section. As noted above, the self-driving system can use metadata associated with each route sections to determine if a given route section is a reverse travelling section.

In accordance with a determination that a particular route section is a reverse travelling section, the self-driving system can access physical model data that represents a position and orientation of the autonomous vehicle in the environment. As noted above, the physical model data can include data describing the location, position, size, dimensions, orientation, and driving dynamics of the autonomous vehicle. The self-driving system can modify the physical model data to generate a simulated orientation based on a direction associated with the reverse travelling section. For example, the self-driving system can change the stored heading of the autonomous vehicle by 180 degrees such that the stored heading is the opposite direction of the actual heading.

The self-driving system can transmit the reverse driving section and the modified physical model data to the motion planner. The motion planner can use existing motion planning techniques and systems to generate a motion plan to move the autonomous vehicle from the current position to the destination position. In this way, the motion planner does not need additional logic or training to enable reverse motion.

In some example embodiments, the self-driving system can receive one or more control signals from the motion planner. In addition, the self-driving system may modify the signal controls to enable the autonomous vehicle to correctly implement the control signals and drive in reverse rather than drive forward. For example, the velocity can be changed from a positive value to a negative value of equal magnitude. In this way, the motion planner does not access the actual orientation of the autonomous vehicle and instead relies on a modified orientation for the autonomous vehicle. The surrounding components of the self-driving system can compensate for the modified orientation by altering the physical model data to ensure the motion plan and the associated control signals correctly direct the autonomous vehicle to the target destination.

In some example embodiments, the self-driving system can modify stored physical model data to enable a motion planner to generate a motion plan with a forward travelling model and use that motion plan to drive the autonomous vehicle in reverse. To do so, the self-driving system can modify stored orientation data for the autonomous vehicle in the physical model data. The stored orientation data can represent, among other data, the direction in which the autonomous vehicle is pointing. This data can be modified such that the modified orientation data indicates that the autonomous vehicle is oriented in a direction 180 degrees different from the actual orientation of the autonomous vehicle. In this way, the motion planner is able to plan a route for the autonomous vehicle as though it were pointing forwards.

In addition, the self-driving system can modify the stored physical dimensions for the autonomous vehicle in the physical model data. For example, when the orientation of the autonomous vehicle is reversed, the internal model of the autonomous vehicle's dimensions can also be updated. Essentially, the physical model of the autonomous vehicle can be reversed, such that the back of the autonomous vehicle is associated with the front side of the internal model and the front side of the autonomous vehicle is associated with the rear side of the internal model. Thus, the motion planner can accurately estimate safe movement for the autonomous vehicle even though the motion planner is generating a motion plan with a stored physical model that is incorrectly representing the actual autonomous vehicle.

Similarly, the driving dynamics can be updated. In some examples, driving dynamics can represent how the autonomous vehicle moves through space and is affected by different driving maneuvers, such as turning. As above, the driving dynamics can be updated to represent how the autonomous vehicle would move when travelling in reverse while the motion planner uses data representing forward motion. For example, some autonomous vehicles are configured to be front-wheel drive and have static rear wheels (e.g., the rear wheels do not change angle during a turn). Thus, when travelling backwards in such a vehicle, the way in which the autonomous vehicle responds to controls differs greatly from the way the autonomous vehicle responds to controls when travelling forward. To safely plan a path that avoids collisions caused by incorrect estimation of how the autonomous vehicle will respond when maneuvering an environment (e.g., turning, stopping, accelerating, and so on), the self-driving system can update data associated with the driving dynamics. This updated data can enable the motion planner to generate a motion plan using the updated driving dynamics data to match the driving dynamics of the actual autonomous vehicle when travelling in reverse.

In some example embodiments, the autonomous driving system also updates stored environmental data for the area around or near the autonomous vehicle. For example, the physical model data for the autonomous vehicle may include data that describes one or more lanes near or around the autonomous vehicle. Each lane can have an associated direction that is determined based, at least partially, on visual lane lines on the travel way (e.g., the road). In some examples, the self-driving system can alter the direction of one or more lanes and switch, from right to left, the locations of one or more lane lines in the stored representation of the physical road (or other travel way). It is important to note that these changes only take place in a computer-based representation of the environment stored in the physical model data associated with the autonomous vehicle and the surrounding environment. When the autonomous vehicle has completed the current route section, the physical model data can be returned to its accurate state. In this way, the self-driving system enables the motion planner to plan a forward movement-based motion plan while the autonomous vehicle is actually going to be driven in reverse.

In some examples, the motion planner can use the modified data to generate a motion plan. As explained above, the motion planner generates the motion plan using modified physical model data that represents the autonomous vehicle as facing in a different direction than the autonomous vehicle is actually facing. As a result, the velocity associated with the generated motion plan is represented as a positive number. However, the autonomous vehicle is actually facing backward, and so the actual velocity can be altered to be a negative value. Once the motion planner has generated the motion plan, the self-driving system can alter the motion plan to reverse the polarity of the velocity associated with the motion plan. In this way, the self-driving system can use the generated motion plan to accurately drive in reverse.

The systems and methods described herein provide a number of technical effects and benefits. More particularly, the systems and methods of the present disclosure provide improved techniques for allowing an autonomous vehicle to drive in reverse using the forward travelling functionality and without having the added difficulty and expense of generating and training a model specifically for reverse driving. For instance, when the system determines that travelling in reverse is necessary, the system creates a simulated version of the physical model data such that the heading is reversed, and a motion planner can use existing tools to plan a forward moving motion plan. In this way, the autonomous vehicle is enabled to add significant technical capability while avoiding costly and resource intensive retraining. This improvement in capability will result in more efficient pathing because the autonomous vehicles can now plan paths that require the autonomous vehicle to drive in reverse and thus is able to pick up passengers in a much greater variety of situations. This additional capability can also result in increased fuel savings for the autonomous vehicle and time saving for the autonomous vehicle itself.

Various means can be configured to perform the methods and processes described herein. For example, a computing system can include routing unit(s), data access unit(s), model modification unit(s), data transmission unit(s), vehicle control unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access a route with one or more route sections, the one or more route sections including a reverse travelling section through an environment. The means can be configured to access physical model data representing a position and actual orientation of the autonomous vehicle in the environment. The means can be configured to modify the physical model data to generate a simulated orientation for the autonomous vehicle based on a direction associated with the reverse travelling section. The means can be configured to transmit data associated with the reverse travelling section of the accessed route and the modified physical model data to a motion planner. The means can be configured to receive from the motion planner, one or more control signals for the autonomous vehicle. The means can be configured to transmit the one or more control signals to a vehicle control system of the autonomous vehicle.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the autonomous vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the autonomous vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the autonomous vehicle 102 and/or its users to coordinate a vehicle service provided by the autonomous vehicle 102. To do so, the operations computing system 104 can manage a database that includes data including vehicle status data associated with the status of vehicles including the autonomous vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the autonomous vehicle).

The operations computing system 104 can communicate with the one or more remote computing devices 106 and/or the autonomous vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the autonomous vehicle 102 including exchanging (e.g., sending and/or receiving) data or signals with the autonomous vehicle 102, monitoring the state of the autonomous vehicle 102, and/or controlling the autonomous vehicle 102. The one or more remote computing devices 106 can communicate (e.g., exchange data and/or signals) with one or more devices including the operations computing system 104 and the autonomous vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the autonomous vehicle 102 including a location (e.g., latitude and longitude), a velocity, acceleration, a trajectory, and/or a path of the autonomous vehicle 102 based in part on signals or data exchanged with the autonomous vehicle 102. In some implementations, the operations computing system 104 can include the one or more remote computing devices 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the autonomous vehicle 102 can provide driving and navigational operation with minimal and/or no interaction from a human driver present in the autonomous vehicle. A semi-autonomous operational mode can be one in which the autonomous vehicle 102 can operate with some interaction from a human driver present in the autonomous vehicle. Park and/or sleep modes can be used between operational modes while the autonomous vehicle 102 performs various actions including waiting to provide a subsequent vehicle service, and/or recharging between operational modes.

An indication, record, and/or other data indicative of the state of the autonomous vehicle, the state of one or more passengers of the autonomous vehicle, and/or the state of an environment including one or more objects (e.g., the physical dimensions and/or appearance of the one or more objects) can be stored locally in one or more memory devices of the autonomous vehicle 102. Additionally, the autonomous vehicle 102 can provide data indicative of the state of the autonomous vehicle, the state of one or more passengers of the autonomous vehicle, and/or the state of an environment to the operations computing system 104, which can store an indication, record, and/or other data indicative of the state of the one or more objects within a predefined distance of the autonomous vehicle 102 in one or more memory devices associated with the operations computing system 104 (e.g., remote from the autonomous vehicle). Furthermore, the autonomous vehicle 102 can provide data indicative of the state of the one or more objects (e.g., physical dimensions and/or appearance of the one or more objects) within a predefined distance of the autonomous vehicle 102 to the operations computing system 104, which can store an indication, record, and/or other data indicative of the state of the one or more objects within a predefined distance of the autonomous vehicle 102 in one or more memory devices associated with the operations computing system 104 (e.g., remote from the autonomous vehicle).

The vehicle 102 can include and/or be associated with the autonomous vehicle computing system 112. The vehicle computing system 112 can include one or more computing devices located onboard the autonomous vehicle 102. For example, the one or more computing devices of the vehicle computing system 112 can be located on and/or within the autonomous vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the autonomous vehicle 102 (e.g., its computing system, one or more processors, and other devices in the autonomous vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the autonomous vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the autonomous vehicle 102 including a front side, rear side, left side, right side, top, or bottom of the autonomous vehicle 102. The autonomy sensor data 116 can be indicative of locations associated with the one or more objects within the surrounding environment of the autonomous vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the autonomous vehicle 102. For example, the map data 122 can provide information regarding: the identity and location of different roadways, road sections, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the autonomous vehicle 102. The positioning system 118 can be any device or circuitry for analyzing the position of the autonomous vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the autonomous vehicle 102 can be used by various systems of the vehicle computing system 112 and/or provided to one or more remote computing devices (e.g., the operations computing system 104 and/or the remote computing device 106). For example, the map data 122 can provide the autonomous vehicle 102 relative positions of the surrounding environment of the autonomous vehicle 102. The vehicle 102 can identify its position within the surrounding environment (e.g., across six axes) based at least in part on the data described herein. For example, the autonomous vehicle 102 can process the autonomy sensor data 116 (e.g., LIDAR data, camera data) to match it to a map of the surrounding environment to get an understanding of the autonomous vehicle's position within that environment (e.g., transpose the autonomous vehicle's position within its surrounding environment).

The autonomy computing system 120 can include a perception system 124, a prediction system 126, a motion planning system 128, and/or other systems that cooperate to perceive the surrounding environment of the autonomous vehicle 102 and determine a motion plan for controlling the motion of the autonomous vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the autonomous vehicle 102 according to the motion plan.

The perception system 124 can identify one or more objects that are proximate to the autonomous vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the autonomous vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the autonomous vehicle 102. The prediction data 132 can be indicative of one or more predicted future locations of each respective object. The prediction data 132 can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the autonomous vehicle 102 based at least in part on the prediction data 132 (and/or other data). The motion plan data 134 can include vehicle actions with respect to the objects proximate to the autonomous vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the autonomous vehicle 102 can perform a certain action (e.g., pass an object) without increasing the potential risk to the autonomous vehicle 102 and/or violating any traffic laws (e.g., speed limits, lane boundaries, signage). The motion plan data 134 can include a planned trajectory, velocity, acceleration, and/or other actions of the autonomous vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the autonomous vehicle actions, a planned trajectory, and/or other operating parameters to the vehicle control systems 138 to implement the motion plan data 134 for the autonomous vehicle 102. For instance, the autonomous vehicle 102 can include a mobility controller configured to translate the motion plan data 134 into instructions. By way of example, the mobility controller can translate a determined motion plan data 134 into instructions for controlling the autonomous vehicle 102 including adjusting the steering of the autonomous vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the autonomous vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the autonomous vehicle 102 that is located in the front of the autonomous vehicle 102 (e.g., driver's seat, front passenger seat). Additionally, or alternatively, a display device can be viewable by a user of the autonomous vehicle 102 that is located in the rear of the autonomous vehicle 102 (e.g., a passenger seat in the back of the autonomous vehicle).

Figure 2:
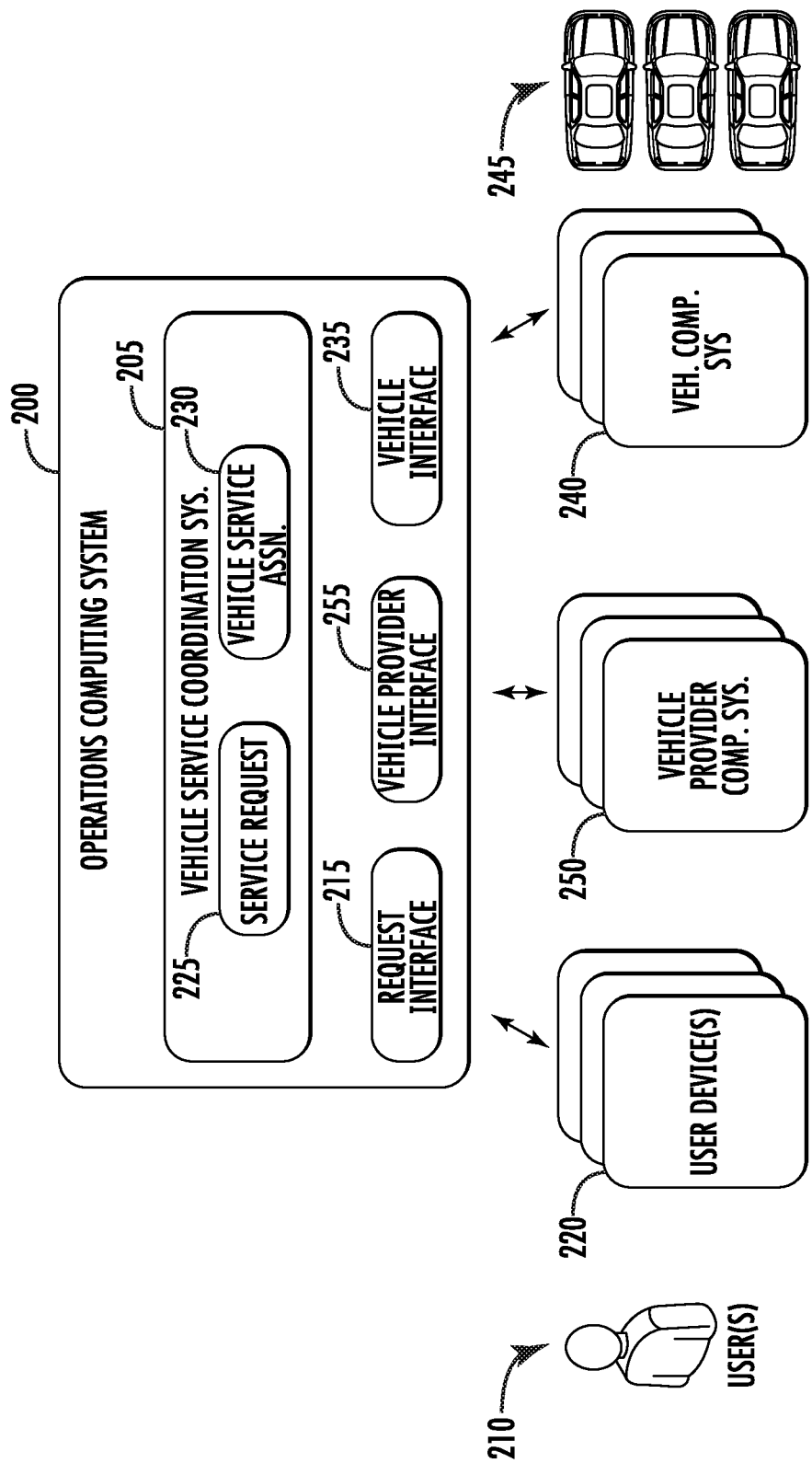
FIG. 2 depicts an example of a multiple entity integration platform according to example embodiments of the present disclosure.

FIG. 2 depicts an example operations computing system 200 of a service entity according to example embodiments of the present disclosure. The operations computing system 200 can be associated with a service entity and/or a vehicle provider. The operations computing system 200 can include a vehicle service coordination system 205 and/or other systems.

The vehicle service coordination system 205 can be configured to coordinate the provision of one or more vehicle services to one or more users. For instance, the operations computing system 200 can include a request interface 215. The request interface 215 can allow the operations computing system 200 to communicate with one or a plurality of user devices 220 (e.g., mobile phones, desktops, laptops, tablets, game systems, etc.). Each user device 220 can be associated with a specific user 210. The request interface 215 can allow the operations computing system 200 and the user device(s) 220 to communicate data to and/or from one another. For example, the user device(s) 220 can communicate (e.g., via the request interface 215) data indicative of a service request 225 for a vehicle service to an operations computing system 200 associated with a service entity.

The vehicle service coordination system 205 can be configured to generate a vehicle service assignment 230. A vehicle service assignment 230 can be indicative of a vehicle service (e.g., requested by a user via the user device(s) 220) to be performed by a vehicle (e.g., an autonomous vehicle). A vehicle service assignment 230 can include a variety of information associated with the vehicle service, the requesting user, the user device, the service entity, etc.

The operations computing system 200 (e.g., the vehicle service coordination system 205) can identity one or more autonomous vehicles that are available for a vehicle service 230. The vehicle service coordination system 205 can identify autonomous vehicle(s) that are online with the service entity associated with the operations computing system 200. The vehicle service coordination system 205 can select an autonomous vehicle for the vehicle service assignment based at least in part on the data indicated in the vehicle service assignment.

The operations computing system 200 can utilize a vehicle interface 235 to communicate data indicative of a vehicle service assignment 230 to one or more vehicle computing systems 240 of one or more autonomous vehicles 245. The vehicle computing system(s) 240 can include the vehicle computing system 100 and/or be configured in similar manner (e.g., as shown in FIG. 1) and the autonomous vehicle(s) 245 can include the autonomous vehicle 105. The vehicle interface 235 can allow the operations computing system 200 and one or a plurality of vehicle computing systems 240 (e.g., of one or a plurality of autonomous vehicles 245) to communicate data to and/or from one another. For example, the operations computing system 200 can communicate, via the vehicle interface 235, data indicative of a vehicle service assignment 230 to one or more vehicle computing system(s) 240 of the autonomous vehicles 245 that the operations computing system 200 selects for the vehicle service assignment 230. Additionally, or alternatively, the vehicle computing system(s) 240 can communicate data associated with the autonomous vehicle(s) 245 to the operations computing system 200. In this way, the operations computing system 200 can coordinate the performance of vehicle service(s) for user(s) by the autonomous vehicle(s) 245 as well as monitor the autonomous vehicle(s) 245.

In some implementations, the operations computing system 200 can select a non-autonomous vehicle (e.g., human driven vehicle) for a vehicle service assignment 230. The vehicle service assignment 230 can be indicative of a request that the operator provide the requested vehicle service to a user associated with the vehicle service assignment 230.

The operations computing system 200 can communicate with one or more vehicle provider computing systems 250 (associated with one or more vehicle providers) via a vehicle provider interface 255. The vehicle provider computing system(s) 250 can include and/or be configured in a similar manner to the vehicle provider computing system 250 (shown in FIG. 2). The vehicle provider computing system(s) 250 can be associated with vehicle providers that are associated with a fleet of autonomous vehicle(s) 245. The vehicle provider interface 255 can allow the operations computing system 200 and one or a plurality of vehicle provider computing systems 250 (e.g., of one or more vehicle providers, etc.) to communicate data to and/or from one another. For example, the operations computing system 200 can communicate, via the vehicle provider interface 255, data indicative of a vehicle service assignment 230, and/or other data as described herein, to one or more vehicle provider computing system(s) 250. The vehicle provider computing system(s) 250 can then communicate such data to the vehicle computing system(s) 240. Additionally, or alternatively, the vehicle provider computing system(s) 250 can communicate data associated with one or more autonomous vehicles 245 (and/or other data) to the operations computing system 200.

A service entity may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, an autonomous vehicle 245 that is associated with a vehicle provider, but that is online only with that service entity (e.g., available to accept vehicle service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, an autonomous vehicle 245 that is currently online with two different service entities so that the autonomous vehicle 245 may accept vehicle service assignment(s) 230 from either service entity (e.g., from the operations computing systems associated therewith, etc.) may be considered to be part of a non-dedicated supply of autonomous vehicles. In some implementations, whether a vehicle is considered to be part of the dedicated supply or the non-dedicated supply can be based, for example, on an agreement between the service entity and a vehicle provider associated with the autonomous vehicle 245.

An autonomous vehicle 245 can enter into an idle state while it is online with the service entity. An idle state can be a state in which the autonomous vehicle is online with a service entity and is not addressing a vehicle service assignment 230 and/or otherwise performing a vehicle service. This can include the time between vehicle service assignments 230. By way of example, an online autonomous vehicle can enter into an idle state after the autonomous vehicle 245 finishes performing a vehicle service for a first vehicle service assignment (e.g., drops off a user at a destination location in accordance with a service request). The idle state can, thus, indicate the time at which the autonomous vehicle is available to perform a vehicle service but is not currently performing and/or assigned to one (e.g., traveling to an origin location, transporting an item/user, traveling to a destination location, etc.).

The operations computing system 200 can determine that an autonomous vehicle 245 is in an idle state. For instance, an autonomous vehicle can be online with a service entity. In some implementations, an autonomous vehicle 245 can communicate data to the operations computing system 200 indicating that the autonomous vehicle 245 has entered into an idle state and/or that the autonomous vehicle 245 has completed a vehicle service assignment 230. This data can be indicative of a vehicle's: service state (e.g., idle, addressing a vehicle service assignment, etc.), online/offline status, current and/or future planned location, whether the autonomous vehicle is in the service entity's dedicated or non-dedicated supply, and/or other information. In some implementations, a vehicle provider computing system 250 (e.g., that is remote from the autonomous vehicle 245) can communicate such data to the operations computing system 200. In some implementations, the operations computing system 200 can monitor an autonomous vehicle 245 to determine that the autonomous vehicle 245 has entered into an idle state. For instance, the operations computing system 200 can obtain (e.g., from the autonomous vehicle 245, from the vehicle provider computing system 250, etc.) data indicating that the autonomous vehicle 245 has completed a first vehicle service assignment and can determine that the autonomous vehicle 245 is not assigned to a second vehicle service assignment.

The operations computing system 200 can aim to ensure that a fleet of autonomous vehicles 245 is productively utilizing its collective computational resources to avoid autonomous vehicles remaining in an idle state. To minimize non-essential use of computing resources, the operations computing system 200 can select and deploy a fleet of autonomous vehicles based on an operational domain in which the fleet is to be deployed and the capabilities of the autonomous vehicles in the fleet. Such selection and deployment can occur prior to an initial deployment of a fleet by a service entity and/or vehicle provider. Additionally, and/or alternatively, selection and deployment of a fleet can be made iteratively after initial deployment of a fleet. For example, operations computing system 200 can determine hourly, daily, or weekly how many autonomous vehicles to deploy in a fleet for an operational domain. In any event, by targeting a particular fleet of autonomous vehicles to an operational domain based on vehicle capabilities, a network of computing devices formed by the autonomous vehicles of the fleet can be optimized to avoid non-essential use of computing resources.

Figure 3:
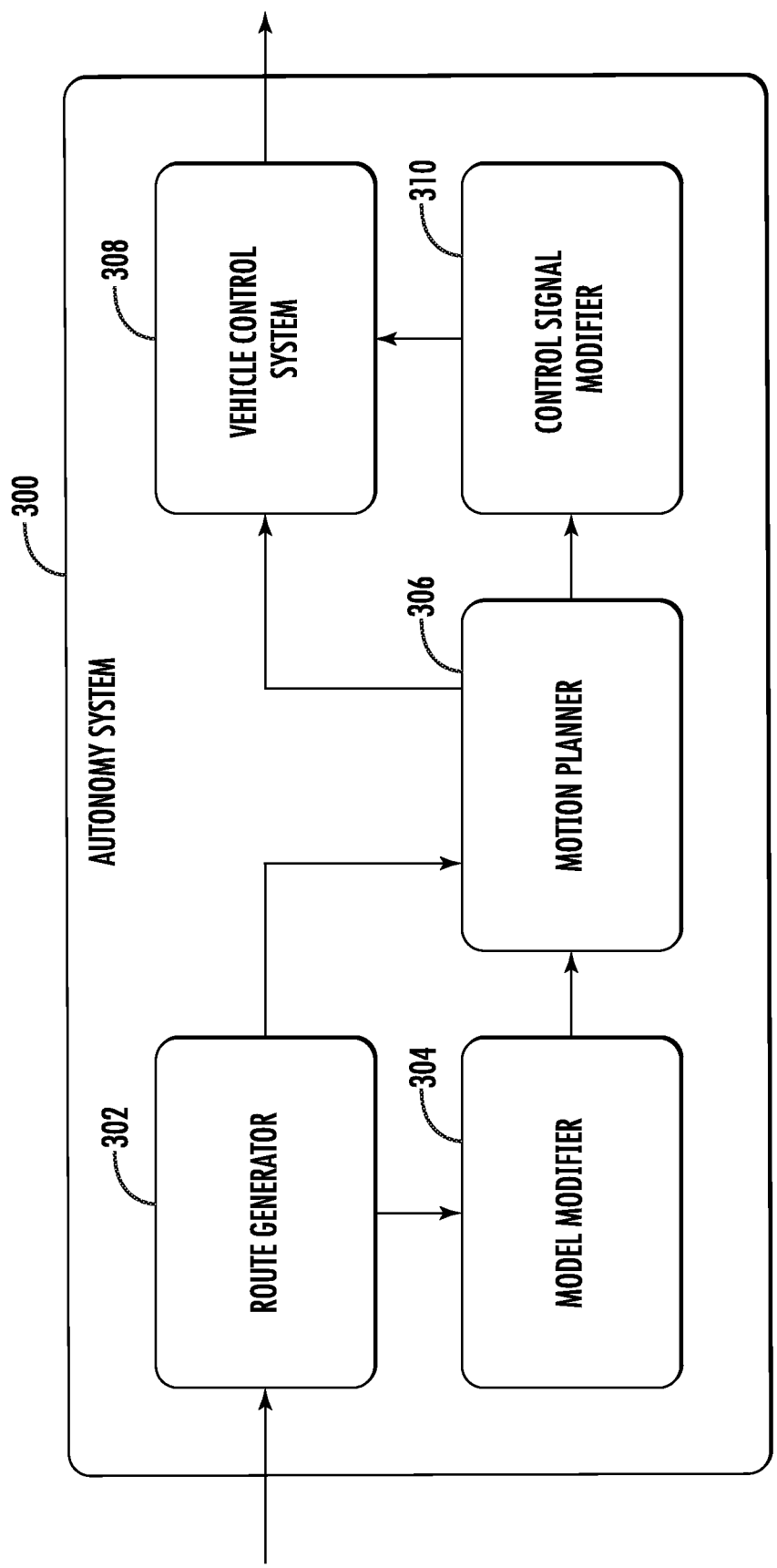
FIG. 3 depicts a block diagram example of a self-driving system for enabling an autonomous vehicle to drive in reverse according to example embodiments of the present disclosure.

FIG. 3 depicts an example autonomy system 300 according to example embodiments of the present disclosure. In some example embodiments, an autonomy system 300 uses one or more existing components to facilitate reverse travelling (e.g., driving, etc.) without the need to train the system with instructions dedicated to implementing the reverse travelling capability. Such an autonomy system 300 can include a route generator 302, a model modifier 304, a motion planner 306, a control signal modifier 310, and a vehicle control system 308. In some example embodiments, the autonomy system 300 can be integrated into the above-discussed vehicle computing system (e.g., system 112 in FIG. 1). In this example, a route generator 302 can generate or receive a planned route with one or more sections. In some examples, the planned route can be received from a service system that transmits a planned destination for an autonomous vehicle to the autonomy system 300 of the autonomous vehicle. In some examples, the route generator 302 can generate the route itself based on user input or a destination received from a third-party.

In some examples, the route generator 302 can determine, for each section of the generated route, whether the route section includes reverse travelling (e.g., driving). In some examples, the route generator 302 can determine whether a specific route section involves reverse driving by accessing a metadata flag associated with each route section that represents whether the route section involves forward movement or backward movement. In some examples, a given route section for an autonomous vehicle can comprise one of either forward driving or reverse driving. Thus, if the flag for reverse driving is set to indicate reverse driving, that route section will be entirely comprised of reverse driving. Similarly, if the metadata flag is not set to indicate reverse driving, the associated route section will only include forward driving.

In some example embodiments, in accordance with a determination that a particular route section includes reverse movement, the route generator 302 can transmit the route section data to a model modifier 304. In accordance with the determination that the current route section does not include reverse motion, the route generator 302 can transmit the route section data directly to a motion planner 306 without accessing the model modifier 306.

In some example embodiments, the model modifier 304 can, in response to receiving route section data from the route generator 302, access stored physical model data for the current autonomous vehicle. The physical model data for a particular autonomous vehicle can represent one or more physical characteristics of the autonomous vehicle and its current environment. For example, the physical model data can include data fields representing one or more of: a heading of the autonomous vehicle, a shape of the autonomous vehicle, a position of the autonomous vehicle, the location and size of bumpers on the autonomous vehicle, the driving dynamics of the autonomous vehicle (e.g., how the autonomous vehicle's physical form responds to acceleration and/or turning), and the location and position of traffic lanes. This physical model data can be used by a motion planner (e.g., model planner 306 of FIG. 3) to ensure that the autonomous vehicle can move safely through an environment.

In some example embodiments, the model modifier 304 can modify the stored physical model data including changing a stored heading of the autonomous vehicle. For example, the model modifier 304 can reverse (e.g., change by 180 degrees) the heading of the autonomous vehicle such that the stored representation of the autonomous vehicle appears to be facing in the exact opposite direction as the autonomous vehicle is actually facing in the physical world. In addition, the model modifier 304 can change the physical model data representing the size and shape of the autonomous vehicle. The model modifier 304 can modify physical model data representing the driving dynamics of the autonomous vehicle. The result of these changes is to modify the stored physical model data of the autonomous vehicle such that physical model data indicates a forward moving autonomous vehicle, but the stored physical model data is shaped like and moves like an autonomous vehicle moving in reverse. As a result, the motion planner 306 makes a motion plan as though the autonomous vehicle were moving forward, but the motion plan will be appropriate for the autonomous vehicle when moving in reverse. Thus, the motion planner 306 does not need specific software to enable reverse motion (e.g., driving, traveling or any other type of motion). Instead, the self-driving system can use an existing motion planning system to plan reverse motion without at least one component in the self-driving system (e.g., the motion planner 306) being aware that the autonomous vehicle will be moving in reverse.

In some examples, once the model modifier 304 has finished updating the physical model data, the route section can be transmitted to the motion planner 306. As noted above, the motion planner 306 can generate a motion plan using the modified physical model data and planning a forward travelling section. In some examples, the motion planner 306 can send a motion plan directly to the vehicle control system 308. For example, when a route section includes forward travelling the motion planner 306 can transmit the motion plan directly to the vehicle control system 308 without the need for the control signal modifier 310 to correct the velocity of the motion plan. In some examples, the motion planner 306 can first transmit the motion plan to a control signal modifier 310. In some examples, the control signal modifier 310 can receive the motion plan from the motion planner 306.

If the motion plan is associated with a route section that includes reverse motion, the control signal modifier 310 can adjust the motion plan such that it can be implemented by the vehicle control system 308 correctly. For example, because the motion planner 306 based the motion plan on stored physical model data that had been modified such that the stored physical data of the autonomous vehicle does not match the actual physical data for the autonomous vehicle, the generated motion plan can be modified to ensure that the vehicle control system can cause the autonomous vehicle to move in the correct direction.

Specifically, the velocity included in the motion plan as generated by the motion planner 306 can include positive forward motion when in fact the vehicle needs to move backward. The control signal modifier 310 can reverse the polarity of the planned velocity from positive to negative. Thus, if the planned velocity is three meters per second in a positive direction, the control signal modifier 310 can reverse the velocity to a negative value of three meters per second. In addition, the control signal modifier 310 may also reset the stored physical model data to their original and correct values.

Once the control signal modifier 310 has modified the motion plan, the motion plan can be sent to the vehicle control system 308. In some example embodiments, the vehicle control system 308 can generate one or more control signals that can cause the execution of the motion plan to move the autonomous vehicle from its current position to the target destination. In some examples, the control signals can control the acceleration, braking, and heading of the autonomous vehicle.

Figure 4A:
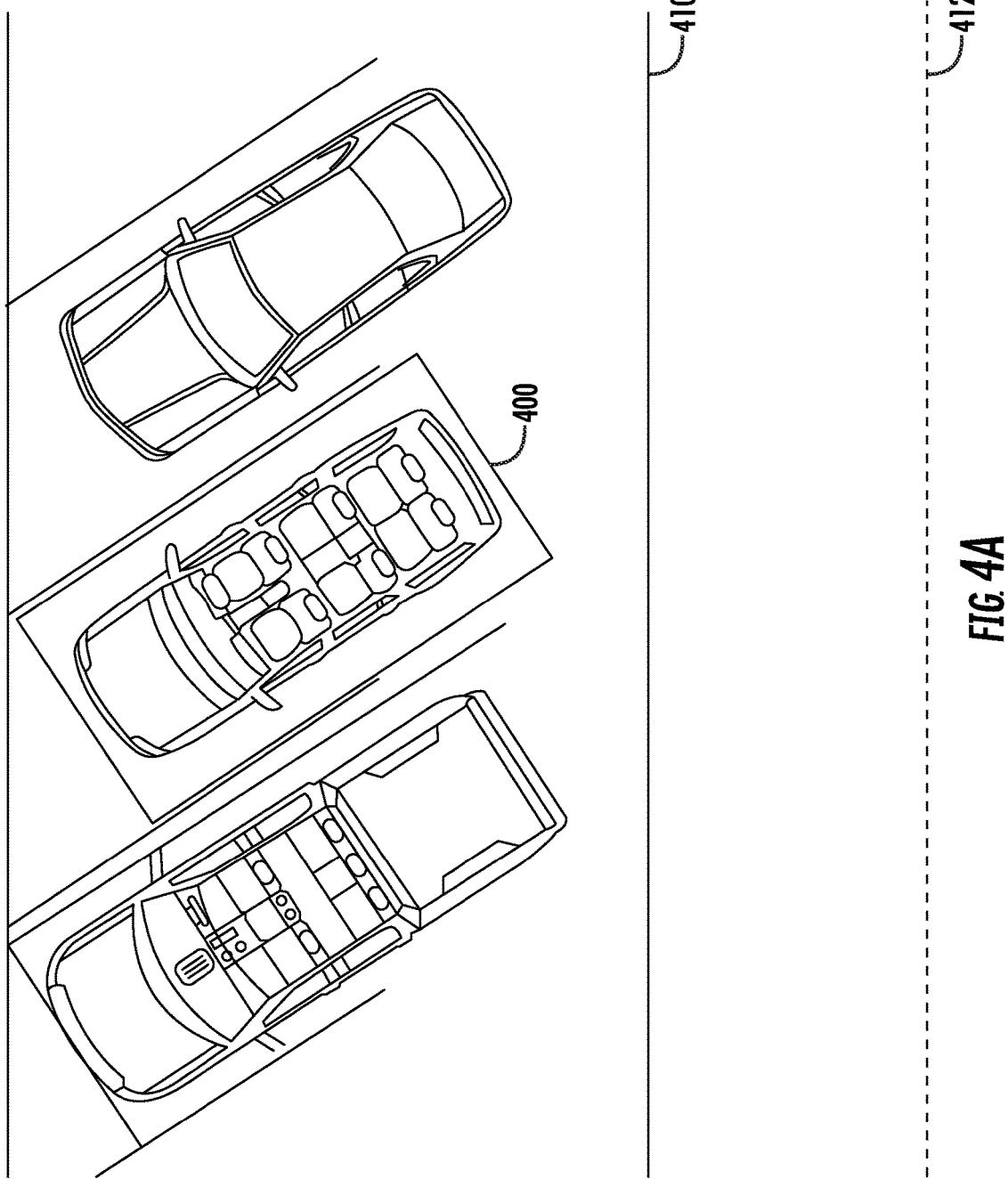

FIGS. 4A-4D depict an example scenario in which an autonomous vehicle drives in reverse according to example embodiments of the present disclosure. FIG. 4A depicts an autonomous vehicle 400 parked in a parking spot in which forward motion is not possible. For example, the autonomous vehicle 400 can be parked against a sidewalk to pick up a passenger or parked close enough to another vehicle that forward motion is not possible. A service system may have directed the autonomous vehicle 400 to park in a passenger loading zone such that the autonomous vehicle 400 is positioned orthogonally to a sidewalk. In this example, the autonomous vehicle 400 is unable to exit the parking spot by moving forward. Thus, the self-driving system can determine that the autonomous vehicle 400 needs to travel in reverse to exit the parking spot. In addition, the autonomous vehicle 400 needs to travel backwards in a direction associated with the lane markings (410 and 412).

FIG. 4B depicts an internal representation of the stored heading and position of an autonomous vehicle 404 according to example embodiments of the present disclosure. Thus, the autonomous vehicle 404 depicted in FIG. 4B is a representation of how the autonomous vehicle 400 in FIG. 4A is internally represented, not a representation of how autonomous vehicle 400 in FIG. 4A is actually positioned and oriented. Similarly, FIG. 4B includes depictions of one or more lane boundaries (e.g., 420 and 421) as they are represented in the internal physical model data and now how they are situated in actually (e.g., 410 and 412 as shown in FIG. 4A). Thus, the internal physical model data includes data describing one or more autonomous vehicles (e.g., autonomous vehicles 404) and lane boundaries (e.g., lane boundaries 420 and 421) that may not match the position and orientation of the autonomous vehicles and lane boundaries as they actually are in the physical world that is represented by the physical model data.

As a result, in response to determining that the autonomous vehicle 400 (e.g., the actual vehicle depicted in FIG. 4A) needs to drive in reverse, the model modifier (e.g., model modifier 304 in FIG. 3) can update the physical vehicle model data such that stored physical model data changes the internal representation of the autonomous vehicle 404 to an orientation that is facing outwards from the sidewalk. As noted above, it is important to note that the actual autonomous vehicle (e.g., autonomous vehicle 400 in FIG. 4A) has not changed its actual heading to face outwards. Instead, only the stored physical model data's representation of the autonomous vehicle 404 has changed. A motion planner (e.g., motion planner 306 in FIG. 3) can access this modified data while generating a motion plan to move the autonomous vehicle (e.g., autonomous vehicle 400 in FIG. 4A) from its current position to a destination position.

The model modifier can modify other data fields of the physical model data. As noted above, the model modifier can modify data fields in the physical model data that represent the autonomous vehicle's shape, size, and dimensions such that the stored physical model data's representation of the autonomous vehicle is positioned and oriented as if the autonomous vehicle is facing backward even though the autonomous vehicle is actually facing forward. In addition, the model modifier can modify the positions of one or more lane boundaries (e.g., 420 and 421) such that the motion planner can plan motion in the correct direction even though the physical model data different from the actual heading and position of the autonomous vehicle.

Figure 4C:
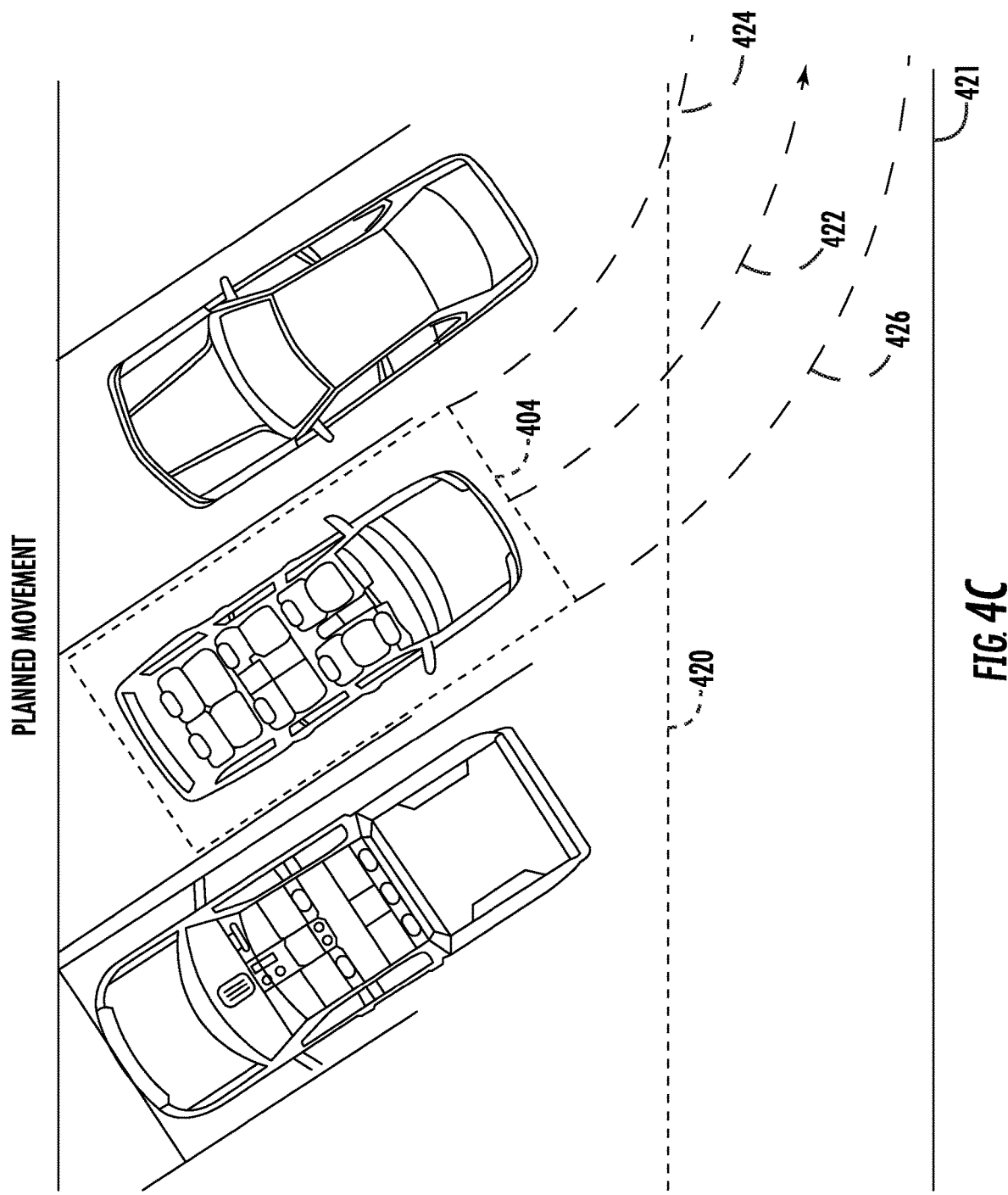

FIG. 4C continues to depict the process for driving in reverse as shown in FIGS. 4A and 4B according to example embodiments of the present disclosure. Once the physical model data has been modified, the motion planner can generate a motion plan (demarcated by 422, 424, and 426) to move the autonomous vehicle 400 (e.g., autonomous vehicle 400 in FIG. 4A) from the parking spot into a travel way (e.g., a road designated by lane boundaries 410 and 412) by using the internal representation of the autonomous vehicle 404. Because the stored physical model data indicates that the autonomous vehicle 404 is facing out of the parking spot, the motion planner can generate a motion plan for the autonomous vehicle 400 (e.g., autonomous vehicle 400 in FIG. 4A) that directs it to move forward out of the parking spot.

Figure 4D:
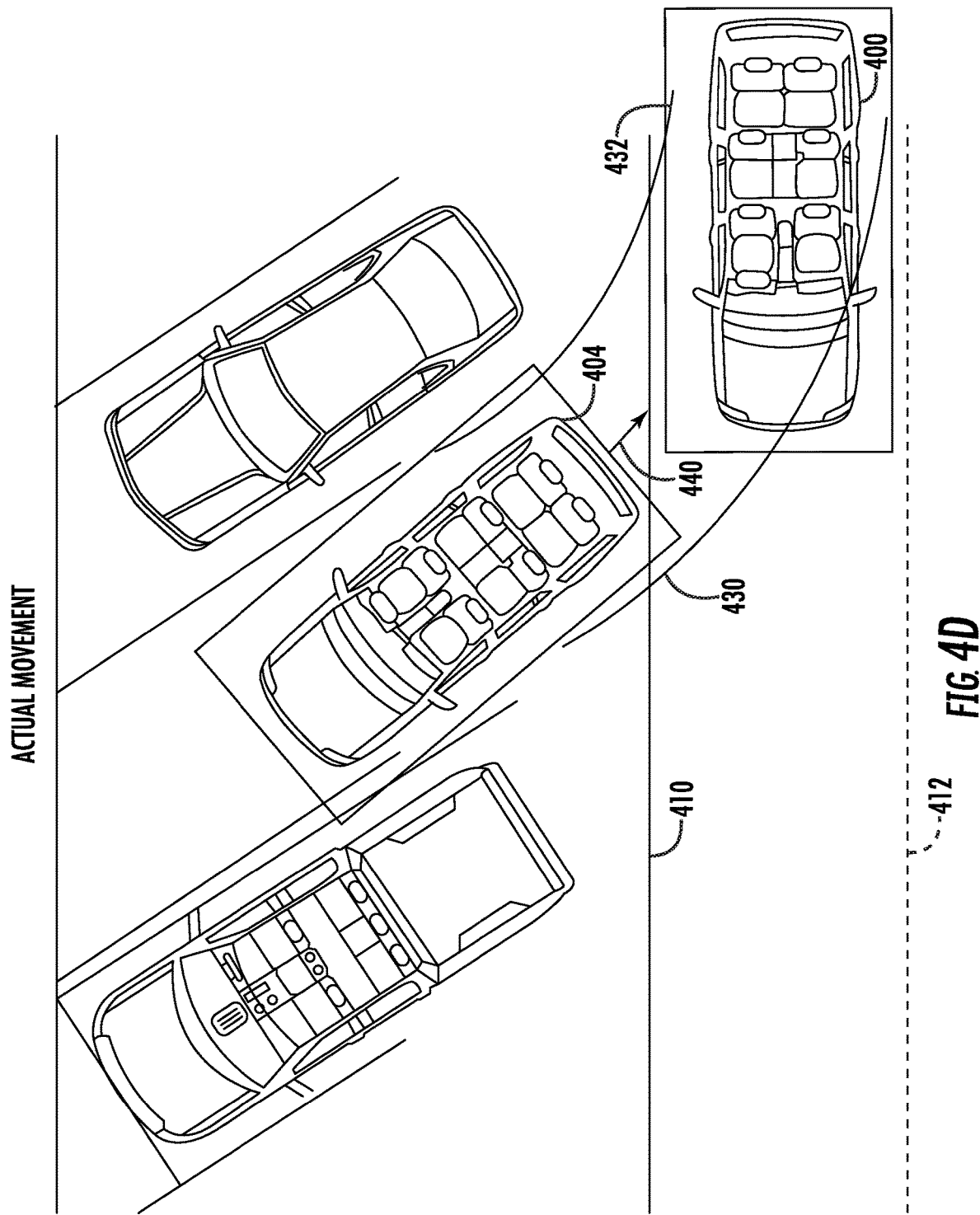

FIG. 4D continues to depict the process for driving in reverse as shown in FIGS. 4A, 4B, and 4C according to example embodiments of the present disclosure. In this example, the autonomous vehicle 400 can execute the motion plan (430, 432, and 440 which represent velocity and direction). However, because the motion plan is created using a forward-facing vehicle model, the velocity 440 included in the motion plan is initially positive and can be reversed from a positive value to a negative value with the same magnitude. Using this reversed velocity value, the autonomous vehicle 400 can drive out of the parking spot in reverse even though the motion plan (430, 432, and 440) is created using a forward-facing vehicle model. In this way, the autonomous vehicle can be enabled to drive in reverse without specific software or model improvements designed to implement that functionality.

Figure 5A:
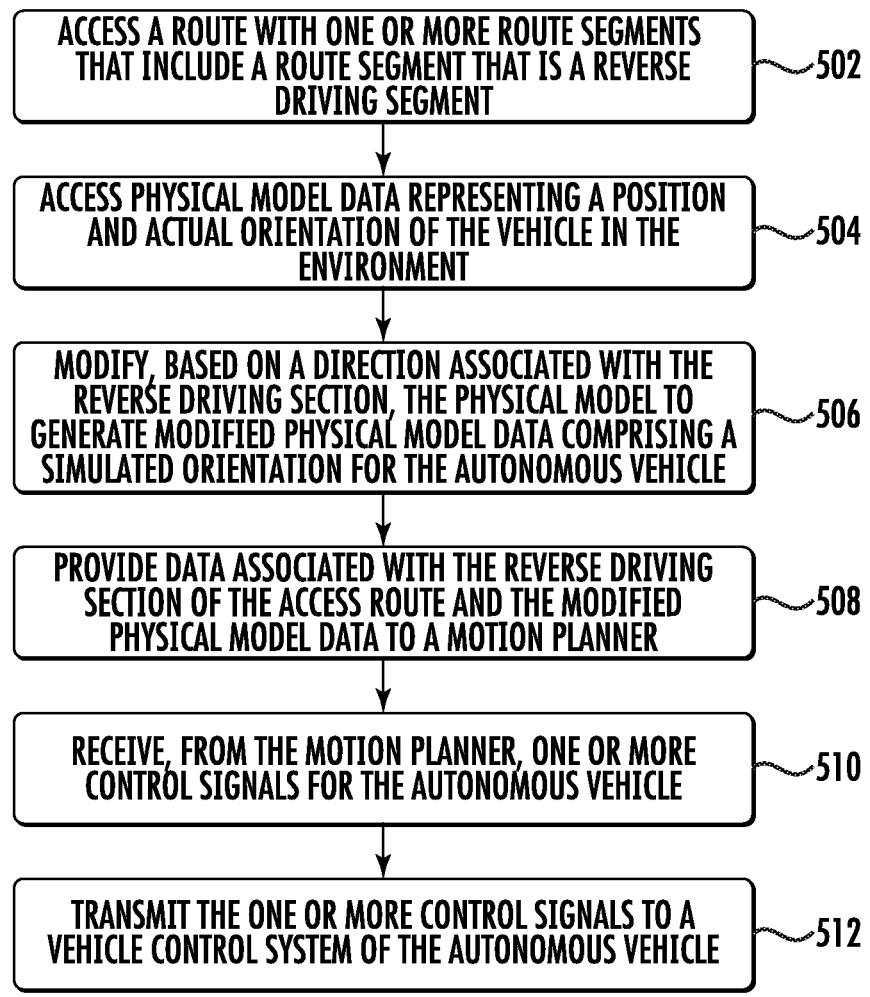
FIGS. 5A-5B depict flowcharts illustrating an example method for enabling an autonomous vehicle to drive in reverse according to example embodiments of the present disclosure.

FIG. 5A depicts an example data flow diagram according to example embodiments of the present disclosure. In some example embodiments, a self-driving system accesses, at 502, a route with one or more route sections. For each route section, the self-driving system can determine whether the route section is a reverse travelling section. As noted above, the self-driving system can use metadata associated with each route sections to determine if a given route section is a reverse travelling section.

In accordance with a determination that a particular route section is a reverse travelling section, the self-driving system can access, at 504, physical model data that represents a position and orientation of the autonomous vehicle in the environment. As noted above, the physical model data can include data describing the location, position, size, dimensions, orientation, and driving dynamics of the autonomous vehicle. The self-driving system can modify, at 506, the physical model data to generate a simulated orientation based on a direction associated with the reverse travelling section. For example, the self-driving system can change the stored heading of the autonomous vehicle by 180 degrees such that the stored heading is the opposite direction of the actual heading.

The self-driving system can provide, at 508, the reverse driving section and the modified physical model data to the motion planner. The motion planner can use existing motion planning techniques and systems to generate a motion plan to move the autonomous vehicle from the current position to the destination position. In this way, the motion planner does not need additional logic or training to enable reverse motion.

In some example embodiments, the self-driving system can receive, at 510, one or more control signals from the motion planner. In addition, the self-driving system may modify the signal controls to enable the autonomous vehicle to correctly implement the control signals and drive in reverse rather than drive forward. For example, the velocity can be changed from a positive value to a negative value of equal magnitude. In this way, the motion planner does not access the actual orientation of the autonomous vehicle and instead relies on a modified orientation for the autonomous vehicle. The surrounding components of the self-driving system can compensate for the modified orientation by altering the physical model data to ensure the motion plan and the associated control signals correctly direct the autonomous vehicle to the target destination.

In some example embodiments, the self-driving system can transmit, at 512, one or more control signals for the autonomous vehicle to a vehicle control system of the autonomous vehicle. The vehicle control system can use the one or more control signals to successfully control the autonomous vehicle to travel in reverse.

Figure 5B:
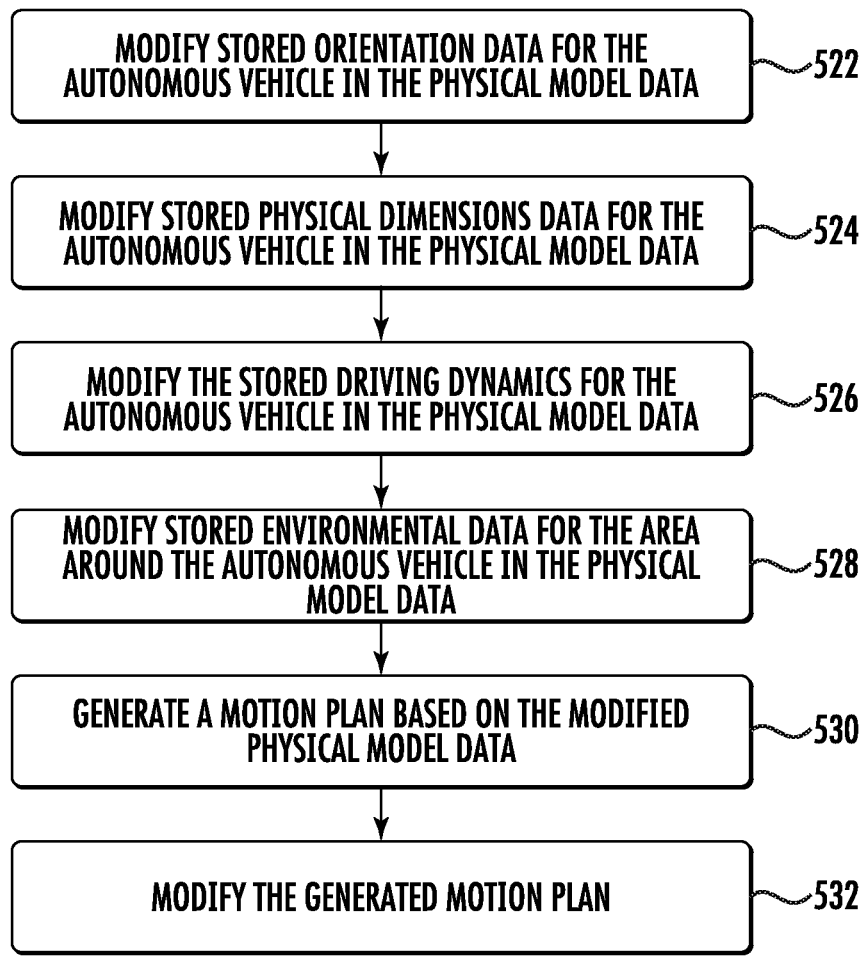

FIG. 5B depicts an example data flow diagram according to example embodiments of the present disclosure. In some example embodiments, the self-driving system can modify stored physical model data to enable a motion planner to generate a motion plan with a forward travelling model and use that motion plan to drive the autonomous vehicle in reverse. To do so, the self-driving system can modify, at 522, stored orientation data for the autonomous vehicle in the physical model data. The stored orientation data can represent, among other data, the direction in which the autonomous vehicle is pointing. This data can be modified such that the modified orientation data indicates that the autonomous vehicle is oriented in a direction 180 degrees different from the actual orientation of the autonomous vehicle. In this way, the motion planner is able to plan a route for the autonomous vehicle as though it were pointing forwards.

In addition, the self-driving system can modify, at 524, the stored physical dimensions for the autonomous vehicle in the physical model data. For example, when the orientation of the autonomous vehicle is reversed, the internal model of the autonomous vehicle's dimensions can also be updated. Essentially, the physical model of the autonomous vehicle can be reversed, such that the back of the autonomous vehicle is associated with the front side of the internal model and the front side of the autonomous vehicle is associated with the rear side of the internal model. Thus, the motion planner can accurately estimate safe movement for the autonomous vehicle even though the motion planner is generating a motion plan with a stored physical model that is incorrectly representing the actual autonomous vehicle.

Similarly, the driving dynamics can be updated. In some examples, driving dynamics can represent how the autonomous vehicle moves through space and is affected by different driving maneuvers, such as turning. As above, the driving dynamics can be modified, at 526, to represent who the autonomous vehicle would move when travelling in reverse while the motion planner uses data representing forward motion. For example, some autonomous vehicles are configured to be front-wheel drive and have static rear wheels (e.g., the rear wheels do not change angle during a turn). Thus, when travelling backwards in such a vehicle, the way in which the autonomous vehicle responds to controls differs greatly from the way the autonomous vehicle responds to controls when travelling forward. To safely plan a path that avoids collisions caused by incorrect estimation of how the autonomous vehicle will respond when maneuvering an environment (e.g., turning, stopping, accelerating, and so on), the self-driving system can update data associated with the driving dynamics. This updated data can enable the motion planner to generate a motion plan using the updated driving dynamics data to match the driving dynamics of the actual autonomous vehicle when travelling in reverse.

In some example embodiments, the autonomous driving system can also modify, at 528, stored environmental data for the area around or near the autonomous vehicle. For example, the physical model data for the autonomous vehicle may include data that describes one or more lanes near or around the autonomous vehicle. Each lane can have an associated direction that is determined based, at least partially, on visual lane lines on the travel way (e.g., the road). In some examples, the self-driving system can alter the direction of one or more lanes and switch, from right to left, the locations of one or more lane lines in the stored representation of the physical road (or other travel way). It is important to note that these changes only take place in a computer-based representation of the environment stored in the physical model data associated with the autonomous vehicle and the surrounding environment. When the autonomous vehicle has completed the current route section, the physical model data can be returned to its accurate state. In this way, the self-driving system enables the motion planner to plan a forward movement-based motion plan while the autonomous vehicle is actually going to be driven in reverse.

In some examples, the motion planner can use the modified data to generate, at 530, a motion plan. As explained above, the motion planner generates the motion plan using modified physical model data that represents the autonomous vehicle as facing in a different direction than the autonomous vehicle is actually facing. As a result, the velocity associated with the generated motion plan is represented as a positive number. However, the autonomous vehicle is actually facing backward, and so the actual velocity can be altered to be a negative value. Once the motion planner has generated the motion plan, the self-driving system can modify, at 532, the motion plan to reverse the polarity of the velocity associated with the motion plan. In this way, the self-driving system can use the generated motion plan to accurately drive in reverse.

Figure 6:
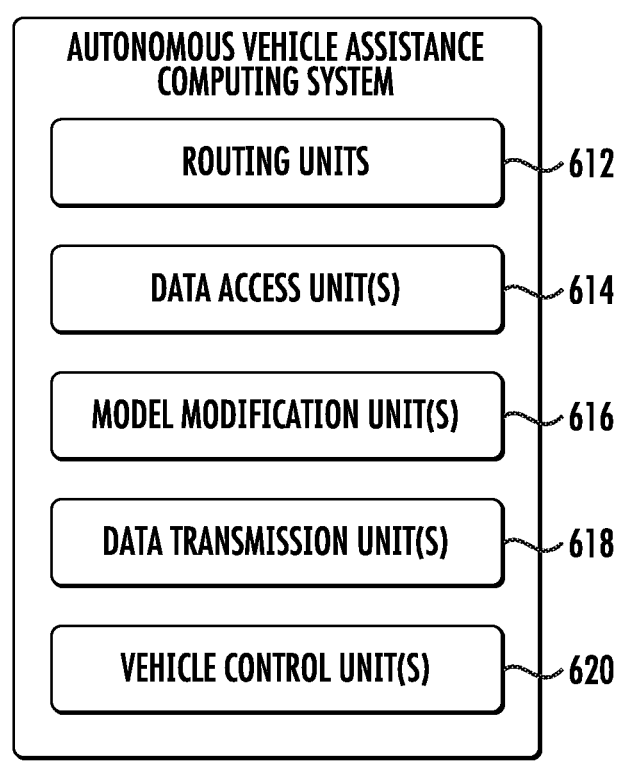
FIG. 6 depicts an example system with units for performing operations and functions according to example aspects of the present disclosure.

Various means can be configured to perform the methods and processes described herein. For example, FIG. 6 depicts a diagram of an example computing system that can include routing unit(s) 612, data access unit(s) 614, model modification unit(s) 616, data transmission unit(s) 618, vehicle control unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be configured to perform one or more algorithm(s) for carrying out the operations and functions described herein. For instance, the means can be configured to access a route with one or more route sections that include a route section that is a reverse driving section. For example, an autonomy system can receive or access a route from a service entity or motion planner that includes a plurality of route sections to be traveled. One or more of the route sections can be a reverse driving section. A routing unit 612 is one example of a means for access a route with one or more route sections that include a route section that is a reverse driving section as described herein.

The means can be configured to access physical model data representing a position and actual orientation of the autonomous vehicle in the environment. For example, the autonomy system can access internally stored representation of the physical location and orientation of the autonomous vehicle. A data access unit 614 is one example of a means for accessing physical model data representing a position and actual orientation of the autonomous vehicle in the environment.

The means can be configured to modify, based on a direction associated with the reverse driving section, the physical model to generate modified physical model data comprising a simulated orientation for the autonomous vehicle. For example, the system can alter the orientation and other data associated with the autonomous vehicle to allow reverse driving to be planned. A model modification unit 616 is one example of a means for modifying, based on a direction associated with the reverse driving section, the physical model to generate modified physical model data comprising a simulated orientation for the autonomous vehicle.

The means can be configured to provide data associated with the reverse driving section of the access route and the modified physical model data to a motion planner and receive one or more control signals for the autonomous vehicle from the motion planner. For example, the autonomy system can transmit the heading and speed of a particular route to the motion planner as well as the modified data. In response, the autonomy system can receive control signals for moving the autonomous vehicle along the route. A data transmission unit 618 is one example of a means for providing data associated with the reverse driving section of the access route and the modified physical model data to a motion planner and receiving one or more control signals for the autonomous vehicle from the motion planner.

The means can be configured to transmit controls signals to a vehicle control system. For example, the means can be configured to transmit one or more controls systems received from the motion planner to the vehicle control system. A vehicle control unit 620 is one example of a means for transmitting controls signals to a vehicle control system. For example, the means can be configured to transmit one or more controls systems received from the motion planner to the vehicle control system.

Figure 7:
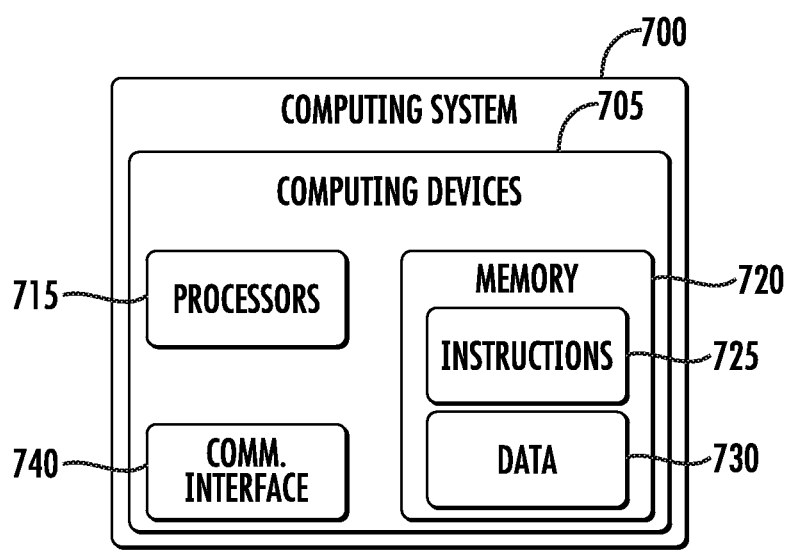
FIG. 7 depicts example system components according to example aspects of the present disclosure.

FIG. 7 depicts a block diagram of an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The computing system 700 can be and/or include the vehicle computing system 100 of FIG. 1. The computing system 700 can be associated with a central operations system and/or an entity associated with the vehicle such as, for example, a vehicle owner, vehicle manager, fleet operator, service provider, etc.

The computing device(s) 705 of the computing system 700 can include processor(s) 715 and at least one memory 720. The one or more processors 715 can be any suitable processing device (e.g., a processor core, a microprocessor, an ASIC, an FPGA, a controller, a microcontroller, etc.) and can be one processor or a plurality of processors that are operatively connected. The memory 720 can include one or more non-transitory computer-readable storage media, such as RAM, ROM, EEPROM, EPROM, one or more memory devices, flash memory devices, magnetic disks, data registers, etc., and combinations thereof.

The memory 720 can store information that can be accessed by the one or more processors 715. For instance, the memory 720 (e.g., one or more non-transitory computer-readable storage mediums, memory devices) can include computer-readable instructions 725 that can be executed by the one or more processors 715. The instructions 725 can be software written in any suitable programming language or can be implemented in hardware. Additionally, or alternatively, the instructions 725 can be executed in logically and/or virtually separate threads on processor(s) 715

For example, the memory 720 on-board the vehicle can store instructions 725 that when executed by the one or more processors 715 cause the one or more processors 715 (e.g., in the vehicle computing system 700) to perform operations such as any of the operations and functions of the computing device(s) 705 and/or vehicle computing system 700, any of the operations and functions for which the vehicle computing system 700 is configured, and/or any other operations and functions described herein.

The memory 720 can store data 730 that can be obtained (e.g., received, accessed, written, manipulated, created, generated, etc.) and/or stored. The data 730 can include, for instance, services data (e.g., trip data, route data, user data, etc.), sensor data, map data, perception data, prediction data, motion planning data, object states and/or state data, object motion trajectories, and/or other data/information as described herein. In some implementations, the computing device(s) 705 can obtain data from one or more memories that are remote from the autonomous vehicle.

The computing device(s) 705 can also include a communication interface 740 used to communicate with one or more other system(s) (e.g., the remote computing system). The communication interface 740 can include any circuits, components, software, etc. for communicating via one or more networks (e.g., network(s)). In some implementations, the communication interface 740 can include, for example, one or more of a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A method of driving an autonomous vehicle in reverse, the method comprising:
  accessing, by a computing system comprising one or more computing devices, a route with one or more route sections, the one or more route sections including a reverse driving section through an environment;
  accessing, by the computer system, physical model data representing a position and actual orientation of the autonomous vehicle in the environment;
  modifying, by the computer system, the physical model data to generate a simulated orientation for the autonomous vehicle based on a direction associated with the reverse driving section;
  transmitting, by the computer system, data associated with the reverse driving section of the accessed route and the modified physical model data to a motion planner;
  receiving, by the computer system, from the motion planner, one or more control signals for the autonomous vehicle; and
  transmitting, by the computer system, the one or more control signals to a vehicle control system of the autonomous vehicle, wherein a path for the autonomous vehicle along the reverse driving section is generated by simulating the autonomous vehicle driving forward from a first point to a second point in the reverse driving section; and
  wherein the path is actuated by a vehicle control system of the autonomous vehicle driving in reverse from the first point to the second point in the reverse driving section.

2. The method of claim 1, wherein modifying the physical model data further includes modifying, by the computer system, one or more of: a stored size, a stored shape, or stored dimensions of the autonomous vehicle in the physical model data to generate at least one of a simulated size, shape, or dimensions.

3. The method of claim 2, wherein modifying the physical model data further includes modifying, by the computer system, bumper locations in the physical model data to generate simulated bumper locations.

4. The method of claim 1, wherein modifying the physical model data further includes modifying, by the computer system, driving dynamics data associated with the autonomous vehicle to generate simulated driving dynamics data.

5. The method of claim 1, wherein the physical model data includes data describing one or more characteristics of an environment surrounding the autonomous vehicle and modifying the physical model data further includes modifying a position of one or more lane boundaries in physical model data to generate simulated lane boundaries.

6. The method of claim 5, wherein modifying the position of the one or more lane boundaries further comprises swapping, by the computer system, the position of the one or more lane boundaries between a first side of a travel way and a second side of a travel way.

7. The method of claim 5, wherein modifying the physical model data further includes reversing, by the computer system, a stored direction of one or more lanes in the environment surrounding the autonomous vehicle to generate simulated lane directions.

8. The method of claim 1, wherein the simulated orientation is generated by:
determining, by the computer system, an actual orientation for the autonomous vehicle; and
modifying, by the computer system, the physical model data such that the simulated orientation differs from the actual orientation by 180 degrees.

9. The method of claim 1, wherein each route section has associated direction data and wherein accessing, by one or more computing devices, a route with one or more route sections further comprises:
for a respective route section of the one or more route sections:
determining, by the computer system, whether the direction data associated with the respective route section indicates that the route section is a reverse driving section; and
in accordance with a determination that the direction data indicates that the respective route section is a reverse driving section:
generating, by the computer system, one or more control signals that cause the autonomous vehicle to reduce a velocity of the autonomous vehicle to zero prior to beginning the reverse driving section.

10. The method of claim 9, further comprising, in accordance with a determination that the direction data indicates that the respective route section is a reverse driving section:
establishing a maximum velocity for the reverse driving section.

11. The method of claim 10, wherein the maximum velocity is 1 m/s.

12. The method of claim 1, further comprising, prior to transmitting the one or more control signals to the vehicle control system:
changing a velocity in the one or more control signals from a positive velocity to a negative velocity with an equal absolute value.

13. An autonomous vehicle comprising:
a processor;
a display; and
a memory that stores instructions that, when executed by the processor, cause the device to perform operations, the operations comprising:
accessing a route with one or more route sections, the one or more route sections including a reverse travelling section through an environment;
accessing physical model data representing a position and actual orientation of the autonomous vehicle in the environment;
modifying the physical model data to generate a simulated orientation based on a direction associated with the reverse travelling section;
transmitting the reverse travelling section of the accessed route and the modified physical model data to a motion planner;
receiving from the motion planner, one or more control signals; and
transmitting the one or more control signals to a vehicle control system, wherein a path for the autonomous vehicle along the reverse driving section is generated by simulating the autonomous vehicle driving forward from a first point to a second point in the reverse driving section; and
wherein the path is actuated by a vehicle control system of the autonomous vehicle driving in reverse from the first point to the second point in the reverse driving section.

14. The autonomous vehicle of claim 13, wherein the operations for generating a simulated orientation further include operations comprising:
determining the actual orientation for the autonomous vehicle; and
updating the simulated orientation in the physical model data such that the simulated orientation differs from the actual orientation by 180 degrees.

15. The autonomous vehicle of claim 13, wherein each route section has associated direction data: and wherein-accessing, by one or more computing devices, a route with one or more route sections further comprises:
for a respective route section of the one or more route sections:
determining whether the direction data associated with the respective route section indicates that the route section is a reverse travelling section; and
in accordance with a determination that the direction data indicates that the respective route section is a reverse travelling section:
generating one or more control signals to reduce a velocity of the autonomous vehicle to zero prior to beginning the reverse travelling section.

16. The autonomous vehicle of claim 15, the operations further comprising, in accordance with a determination that the direction data indicates that the respective route section is a reverse travelling section:
establishing a maximum velocity for the reverse travelling section.

17. A non-transitory computer-readable medium storing instructions that, when executed by one or more computing devices, cause the one or more computing devices to perform operations, the operations comprising:
accessing a route with one or more route sections, the one or more route sections including a reverse travelling section through an environment;
accessing physical model data representing a position and actual orientation of the autonomous vehicle in the environment;
modifying the physical model data to generate a simulated orientation based on a direction associated with the reverse travelling section;
transmitting the reverse travelling section of the accessed route and the modified physical model data to a motion planner;

receiving from the motion planner, one or more control signals; and transmitting the one or more control signals to a vehicle control system, wherein a path for the autonomous vehicle along the reverse driving section is generated by simulating the autonomous vehicle driving forward from a first point to a second point in the reverse driving section; and wherein the path is actuated by a vehicle control system of the autonomous vehicle driving in reverse from the first point to the second point in the reverse driving section.

18. The non-transitory computer-readable medium of claim 17, wherein the operations for generating a simulated orientation further include operations comprising:

determining the actual orientation for the autonomous vehicle; and updating the simulated orientation in the physical model data such that the simulated orientation differs from the actual orientation by 180 degrees.

19. The non-transitory computer-readable medium of claim 17, wherein each route section has associated direction data and wherein accessing, by one or more computing devices, a route with one or more route sections further comprises:

for a respective route section of the one or more route sections:

determining whether the direction data associated with the respective route section indicates that the route section is a reverse travelling section; and in accordance with a determination that the direction data indicates that the respective route section is a reverse travelling section:

generating one or more control signals that cause a velocity of the autonomous vehicle to zero prior to beginning the reverse travelling section.

20. The non-transitory computer-readable medium of claim 17, the operations further comprising, in accordance with a determination that the direction data indicates that the respective route section is a reverse travelling section:

establishing a maximum velocity for the reverse travelling section.

* * * * *